(12) United States Patent
Kadiyala et al.

(10) Patent No.: US 11,860,883 B2
(45) Date of Patent: Jan. 2, 2024

(54) SYSTEM AND METHOD FOR IMPLEMENTING DATA USAGE ANALYSIS FOR DATABASE SYSTEMS

(71) Applicant: JPMorgan Chase Bank, N.A., New York, NY (US)

(72) Inventors: Vijaya Kadiyala, Hyderabad (IN); Subramaniam Ramaiah, Bengaluru (IN); Jahnavi Ramanadham, Hyderabad (IN); Krishna Raj Mahindrakar, Hyderabad (IN); Suresh Amdekar, Hyderabad (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 199 days.

(21) Appl. No.: 16/561,557

(22) Filed: Sep. 5, 2019

(65) Prior Publication Data
US 2021/0073222 A1    Mar. 11, 2021

(51) Int. Cl.
*G06F 16/2458* (2019.01)
*G06F 16/22* (2019.01)
*G06F 16/242* (2019.01)
*G06F 40/205* (2020.01)

(52) U.S. Cl.
CPC ........ *G06F 16/2458* (2019.01); *G06F 16/221* (2019.01); *G06F 16/243* (2019.01); *G06F 40/205* (2020.01)

(58) Field of Classification Search
CPC .. G06F 16/2458; G06F 16/243; G06F 16/221; G06F 40/205; G06F 2212/1044; G06F 2212/1041; G06F 3/0631; G06F 2009/45583; G06F 9/5016; G06F 16/215; G06F 40/177; G06F 2212/401; G06F 3/0608; G06F 16/2282; G06F 16/2281
See application file for complete search history.

(56) References Cited

U.S. PATENT DOCUMENTS 8,918,439 B2 *  12/2014  Alatorre ............... G06F 16/122
                                                    718/1
8,935,493 B1 *  1/2015   Dolan .................. G06F 3/0649
                                                    711/161
9,298,389 B2 *  3/2016   Kolvick ............... G06F 3/0647
(Continued)

OTHER PUBLICATIONS

Gibson, Dan. "Hot, Warm and Cold Data Find a Home with Storage Groups", Sep. 30, 2012, TechChannel, Key Enterprises LLC. (Year: 2012).*

*Primary Examiner* — Vaishali Shah
*Assistant Examiner* — Lana Alagic
(74) *Attorney, Agent, or Firm* — Greenblum & Bernstein, P.L.C.

(57) ABSTRACT

An embodiment of the present invention is directed to implementing a data usage analytics engine for database systems. An embodiment of the present invention is directed to implementing a Data Usage Analysis engine that receives queries (e.g., SQL queries), tables (e.g., Internal Catalog tables) and/or other data formats as input. An embodiment of the present invention may then parse the queries and identify various data usage patterns. This may include details concerning what tables are used, how much data is queried at what intervals, frequency of querying along what attributes are used in the queries and/or other usage details in various levels of granularity.

18 Claims, 5 Drawing Sheets

(56) References Cited

U.S. PATENT DOCUMENTS

| | | | |
|---|---|---|---|
| 2005/0256884 A1* | 11/2005 | Arnold | G06F 16/24552 |
| 2013/0151654 A1* | 6/2013 | Brech | G06F 15/167 |
| | | | 709/216 |
| 2015/0350324 A1* | 12/2015 | Hu | H04L 67/1031 |
| | | | 709/219 |
| 2016/0019249 A1* | 1/2016 | Gunjan | G06F 16/182 |
| | | | 707/715 |
| 2017/0235485 A1* | 8/2017 | Davis | G06F 3/0631 |
| | | | 711/113 |
| 2019/0235758 A1* | 8/2019 | Constantinescu | G06F 3/0644 |
| 2020/0042222 A1* | 2/2020 | Ramaswamy | G06F 3/0619 |
| 2020/0125582 A1* | 4/2020 | O'Shaughnessy | G06F 3/0619 |

* cited by examiner

SYSTEM AND METHOD FOR IMPLEMENTING DATA USAGE ANALYSIS FOR DATABASE SYSTEMS

FIELD OF THE INVENTION

The invention relates generally to a system and method for implementing a data usage analytics engine for database systems.

BACKGROUND OF THE INVENTION

Data is growing exponentially across various platforms. Businesses are required to maintain and preserve data pursuant to legal and other requirements. However, most businesses store more data than what is needed where large amounts of data are stored on local platforms hut accessed infrequently. Current systems lack a standard process for analyzing the data across platforms to understand data usage patterns. When an entity runs out of data storage space, System Administrations and Database Administrators (DBAs) are required to manually add additional storage and/or delete the data from system. DBAs may even reach out to the Application Development Teams to confirm what data to delete. Current systems lack an intelligent approach to identify un-used data. Accordingly, data is deleted, archived and managed in an inconsistent manner.

These and other drawbacks exist.

SUMMARY OF THE INVENTION

According to one embodiment, the invention relates to a system that implements a data usage analytics engine for database systems. The system comprises: a storage component configured to store data usage analytics data; an interactive user interface configured to receive user input via a communication network; and a computer processor, coupled to the storage component and the communication network, configured to perform the steps of: receiving one or more database queries; identifying one or more database tables associated with the one or more database queries; parsing, via a data usage analytics engine, the one or more database queries to identify usage metrics; generating, via the data usage analytics engine, one or more data usage patterns based on the usage metrics wherein the data usage patterns identify what tables are used, how much of data is queried at what intervals, frequency of querying, and one or more attributes used in the queries; transmitting the data usage patterns to the interactive user interface; and determining an optimal storage configuration for remote and local storage based on the data usage patterns.

According to another embodiment, the invention relates to a method that implements a data usage analytics engine for database systems. The method comprises the steps of: receiving one or more database queries; identifying one or more database tables associated with the one or more database queries; parsing, via a data usage analytics engine, the one or more database queries to identify usage metrics; generating, via the data usage analytics engine, one or more data usage patterns based on the usage metrics wherein the data usage patterns identify what tables are used, how much of data is queried at what intervals, frequency of querying, and one or more attributes used in the queries; transmitting the data usage patterns to an interactive user interface; and determining an optimal storage configuration for remote and local storage based on the data usage patterns.

The system may include a specially programmed computer system comprising one or more computer processors, interactive interfaces, electronic storage devices, and networks. The computer implemented system and method described herein provide unique advantages to entities, organizations and other users, according to various embodiments of the invention. With an embodiment of the present invention, users and entities save significant manual hours and resources normally required to identify data use trends, e.g., Hot, Warm, Cold, etc. Current systems generally classify data in broad categories that fail to consider data usage patterns in any meaningful way. Based on data usage patterns, an embodiment of the present invention may automatically offload un-used data to alternative storage devices, including low cost storage services and/or archival services thereby reduce the overall cost of the platform. An embodiment of the present invention provides metrics and analysis concerning the users accessing the data, how frequently the data is being accessed and for what purpose. By providing a more comprehensive understanding of data usage, an embodiment of the present invention may more intelligently and efficiently store and manage large amounts of data for an entity.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

Figure 1:
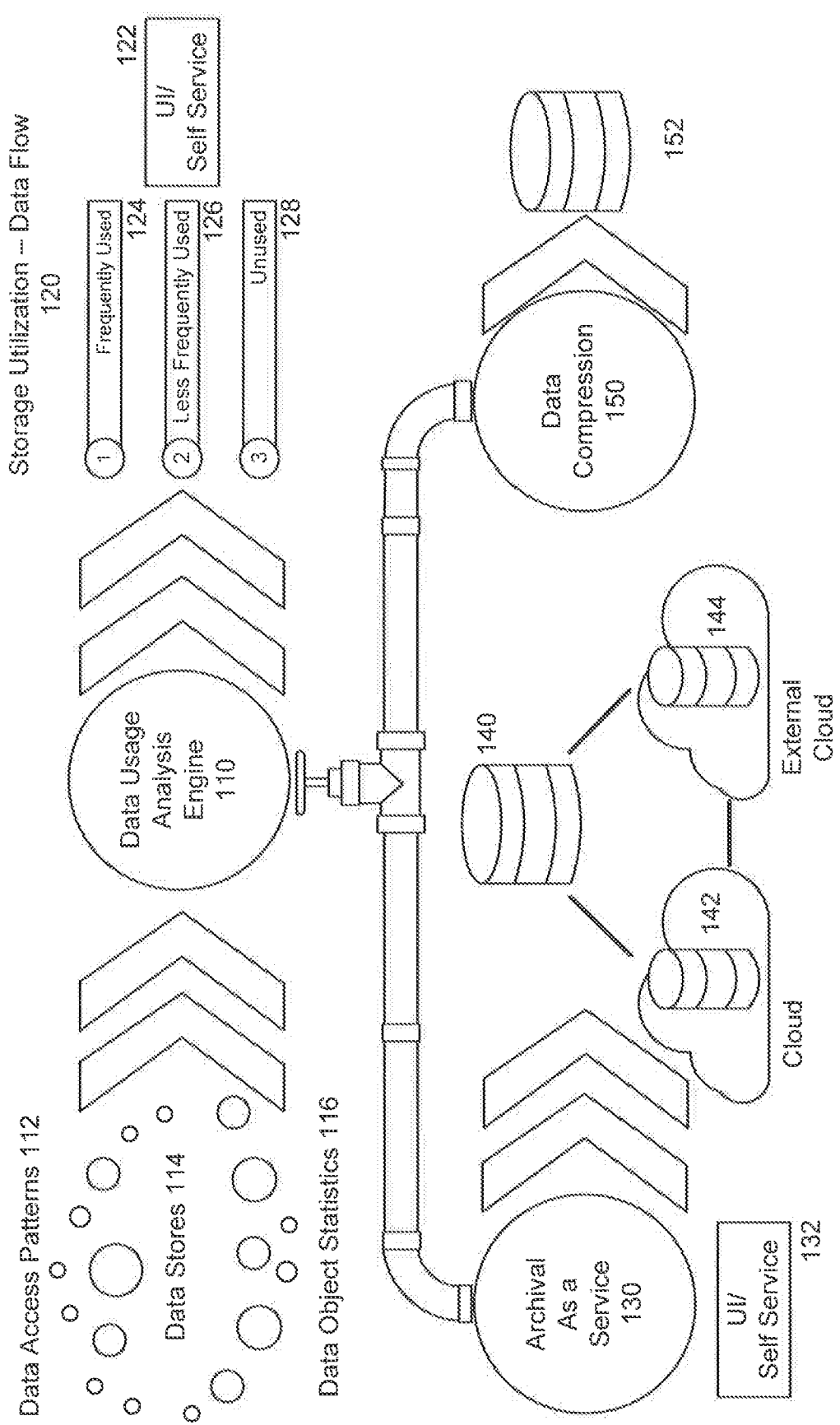
FIG. 1 illustrates a system that implements a data usage analytics engine for database systems, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to implementing a Data Usage Analysis engine that receives queries (e.g., SQL queries), tables (e.g., internal Catalog tables) and/or other portions or sections of data. An embodiment of the present invention may then parse the queries and identify various data usage patterns. This may include details concerning what tables are used, how much data is queried at what intervals, frequency of querying along what attributes are used in the queries and/or other usage details in various levels of granularity.

An embodiment of the present invention may ascertain data usage patterns based on the queries that are executed. This information may then be used to determine portions of data that are not frequently used, portions of data that are frequently used and the specifics concerning the data usage (e.g., this type of data has not used in the X number of months or other time period). An embodiment of the present invention may further analyze or dissect queries and the associated data. For example, an embodiment of the present invention may identify that a user or type of user executes a query that relates to transaction data and further determine how the data is being used and for what purpose, e.g., whether the data to generate reports from a table, whether the user is accessing costs from the table, etc. An embodiment of the present invention is directed to identifying users or types of users and data usage patterns (e.g., query data, how the data is being used, frequency at which the data is queries, etc.) and then categorizing the data based on usage (e.g., Hot, Warm, Luke Warm, Cold, Frozen, etc.). This information may then be used to intelligently and efficiently store and/or manage the data in an appropriate storage service or device and then made available as needed.

An embodiment of the present invention may apply a prediction feature to the data usage patterns. For example, an embodiment of the present invention may identify that a type of user (e.g., role, specific user, etc.) is predicted to access a type of dataset at a particular time period or range (e.g., first week of June every year, etc.). For example, an embodiment of the present invention may predict when data will likely be accessed based on user data patterns and then move the data from an archival storage service to a local server or high cost storage device for convenient and faster access. Accordingly, an embodiment of the present invention may be directed to moving or otherwise positioning data based on data usage patterns.

With an embodiment of the present invention, users and entities may save significant manual hours to identify data use trends, e.g., Hot, Warm, Luke Warm, Cold, Frozen Data. Based on data usage patterns, an embodiment of the present invention may offload un-used data to low cost storage devices and thereby reduce the overall cost of the platform. For example, by understanding who the users are who are accessing what data and the frequency at which the data is accessed, an embodiment of the present invention may intelligently and efficiently store and move data between various storage services. An embodiment of the present invention may recognize that out of the 20 million requests, there are 15 million requests that were not active in the most recent time period. That information may be used to determine what data should be kept in local storage as opposed to remote storage or archival services.

An embodiment of the present invention may be directed to efficiently managing data based on data usage patterns. For example, an entity may operate with a limited amount of storage (or storage cost). Based on data usage patterns, an embodiment of the present invention may be move data from high cost short term storage to long-term storage and back to high cost short term storage when needed. An embodiment of the present invention may effectively identify data for long-term storage to then free up storage for new and/or critical projects rather than having to purchase additional high cost short term storage. This may further reduce operational spend and expenditure costs.

An embodiment of the present invention further recognizes that some data cannot be moved to remote storage or archival services. In such instances, an embodiment of the present invention may compress local storage and/or provide other alternatives to conserving the data and using less storage space.

An embodiment of the present invention may also consider service level agreements (SLA) and other business considerations when managing and storing data in various platforms. For example, data may be stored in an archival storage and then retrieved from the archival storage (as opposed to maintaining the data in a more costly local option) and still be compliant with SLA and other requirements.

FIG. 1 illustrates a system that implements a data usage analytics engine for database systems, according to an embodiment of the present invention. As shown in FIG. 1, Data Usage Analytics Engine 110 may receive data input from a plurality of Data Stores 114. Data Stores may represent various types of storage components, e.g., databases, sources, etc. Data Usage Analytics Engine may receive data access patterns 112, as well as other forms of data that relate to data access and usage. Data Usage Analytics Engine 110 may also access data object statistics 116, Data Usage Analytics Engine 110 may process the input data and identify storage utilization data flows represented by 120. This may include frequently used data 124, less frequently used data 126 and un-used data 128 in varying degrees and frequencies of access via user interface 122. Other categories of data may be identified. Data Usage Analytics Engine 110 may manage data storage components, represented by Archival as a Service 130, Data Sources 140, Cloud Services 142, 144, etc. Data compression 150 may be applied to local storage components 152. An embodiment of the present invention further recognizes that some data cannot be moved to remote storage or archival services. As shown by 150, an embodiment of the present invention may compress local storage and/or provide other alternatives to conserving the data and using less storage space. The components illustrated in FIG. 1 are merely exemplary, other devices may be represented in various applications. While a single component is illustrated, each component may represent multiple components.

An entity, such as a financial institution, may host Data Usage Analytics Engine 110 according to an embodiment of the present invention. The entity may support Data Usage Analytics Engine 110 as an integrated feature or system. According to another example, Data Usage Analytics Engine 110 may be offered by a third party service provider. Other scenarios and architectures may be implemented. An embodiment of the present invention may send and/or receive data from various other sources represented by databases. Databases may be internal or external to a host entity. Data may be stored and managed in storage components via one or more networks. Databases may include any suitable data structure to maintain the information and allow access and retrieval of the information. The storage may be local, remote, or a combination thereof with respect to Databases. Communications with Databases may be over a network, or communications may involve a direct connection between Databases and Entity, as depicted in FIG. 1. Databases may also represent cloud or other network based storage.

A user of an embodiment of the present invention may communicate with the Data Usage Analytics Engine via a network through a User Interface or other Self Service portal, such as 122, 132. Communication may be performed using any mobile or computing device, such as a laptop computer, a personal digital assistant, a smartphone, a smartwatch, smart glasses, other wearables or other computing devices capable of sending or receiving network signals.

The system 100 of FIG. 1 may be implemented in a variety of ways. Architecture within system 100 may be implemented as hardware components (e.g., module) within one or more network elements. It should also be appreciated that architecture within system 100 may be implemented in computer executable software (e.g., on a tangible, non-transitory computer-readable medium) located within one or more network elements. Module functionality of architecture within system 100 may be located on a single device or distributed across a plurality of devices including one or more centralized servers and one or more mobile units or end user devices. The architecture depicted in system 100 is meant to be exemplary and non-limiting. For example, while connections and relationships between the elements of system 100 are depicted, it should be appreciated that other connections and relationships are possible. The system 100 described below may be used to implement the various methods herein, by way of example. Various elements of the system 100 may be referenced in explaining the exemplary methods described herein.

Figure 2:
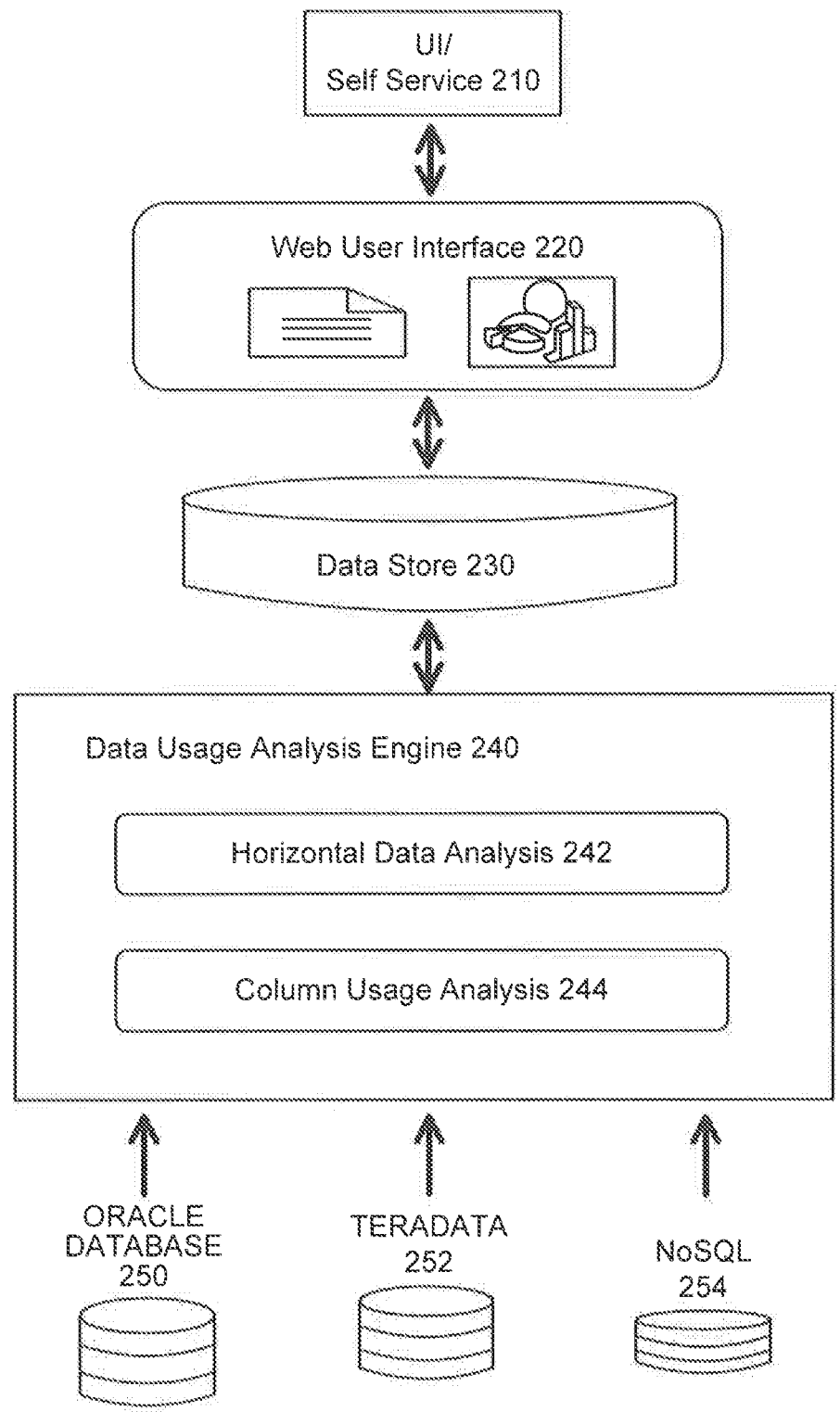
FIG. 2 illustrates a system that implements a data usage analytics engine for database systems, according to an embodiment of the present invention.

FIG. 2 illustrates a system that implements a data usage analytics engine for database systems, according to an embodiment of the present invention. Data Usage Analytics Engine 240 may include Horizontal Data Analysis 242, Column Usage Analysis 244, for example. For example, data usage analysis may refer to identifying tables that are being used within a particular database. An embodiment of the present invention may identify usage patterns and further classify the tables to indicate usage, such as Hot (Used) or Cold (Unused). Column usage (or Attribute usage) may refer to identifying columns and/or attributes within a table and further identify usage categories, such as Hot (Used) or Cold (Unused). Other categories and variations may be applied.

Other data and/or usage analysis may be supported. Data Usage Analytics Engine 240 may receive data relating to data access or other usage from various sources, including Data Store such as Oracle 250, Teradata 252, NoSQL 254, etc. Data Usage Analytics Engine may store data at Data Store 230. A user may access the Data Usage Analytics Engine through an interactive user interface via Web User Interface 220 and Self Service interface 210.

Figure 3:
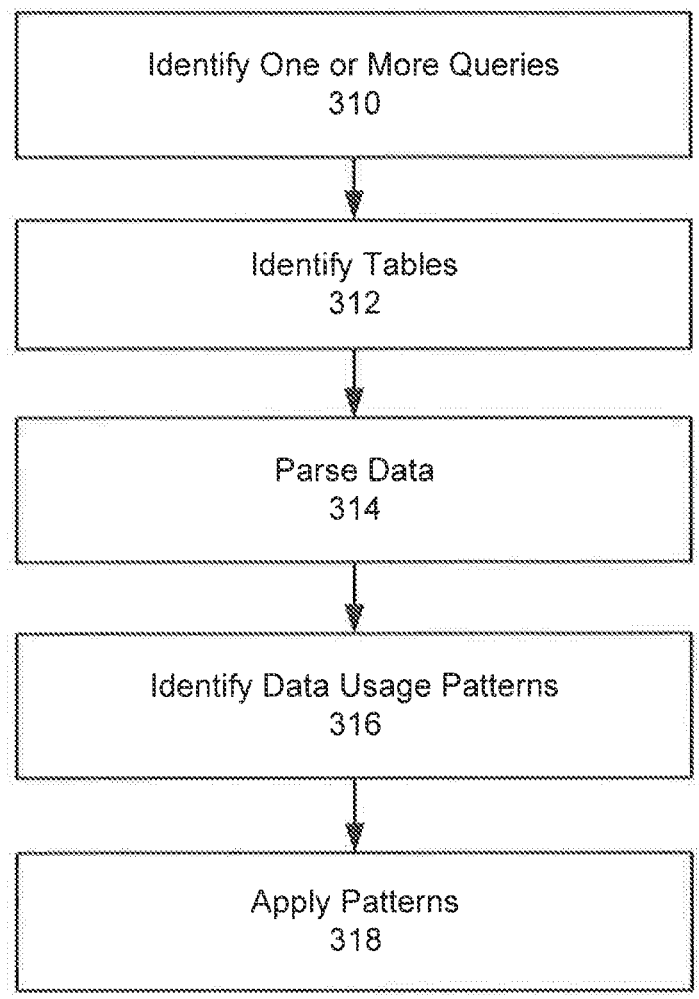
FIG. 3 illustrates an exemplary flow chart of data usage analysis for database systems, according to an embodiment of the present invention.

FIG. 3 illustrates an exemplary flow chart of a data usage analytics engine for database systems, according to an embodiment of the present invention. At step 310, one or more queries may be identified. Queries may include SQL queries and other database related queries. At step 312, tables may be identified. The tables may include internal catalog tables as well as other portions of data. At step 314, data may be parsed to identify usage metrics. Parsing may identify used and unused tables or columns/attributes. Metrics may refer to a measure of usage patterns for tables or columns/attributes. For example, usage patterns may be identified and collected on a periodic basis (e.g., monthly basis) for analysis.

At step 316, data usage patterns may be identified. This may include what tables are used, what data is queries, data frequency, data intervals, etc. At step 318, the patterns may be applied. This may include identify improved storage configurations. While the process of FIG. 3 illustrates certain steps performed in a particular order, it should be understood that the embodiments of the present invention may be practiced by adding one or more steps to the processes, omitting steps within the processes and/or altering the order in which one or more steps are performed.

Figure 4:
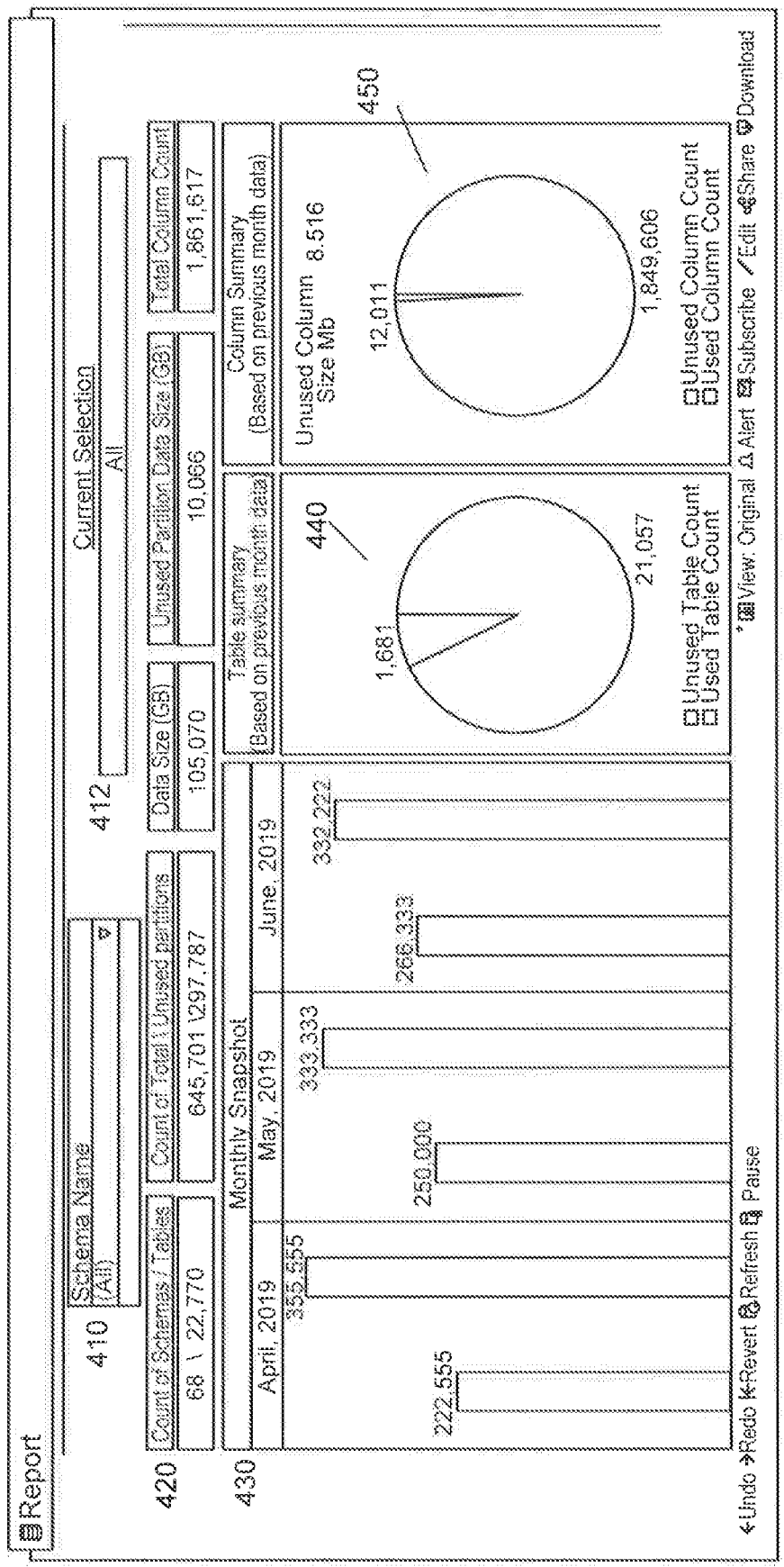
FIG. 4 is an exemplary interactive user interface, according to an embodiment of the present invention.

FIG. 4 is an exemplary interactive user interface, according to an embodiment of the present invention. FIG. 4 provides data usage patterns for a specific Production Database (or group of databases), FIG. 4 illustrates schema name 410 and current selections 412. Various metrics may be provided at 420, including Count of Schernas\Tables; Count of Total\Unused Partitions; Data Size; Unused Partition Data Size; Total Column Count, for example, Monthly Snapshots 430 may include usage metrics on monthly intervals. Other time periods (e.g., daily, weekly, quarterly, annual, user specified time period, etc.) may be applied for additional details and analysis. Summary data may be provided, including Table Summary 440 and Column Summary 442. FIG. 4 is merely exemplary; other metrics and calculations may be provided.

Figure 5:
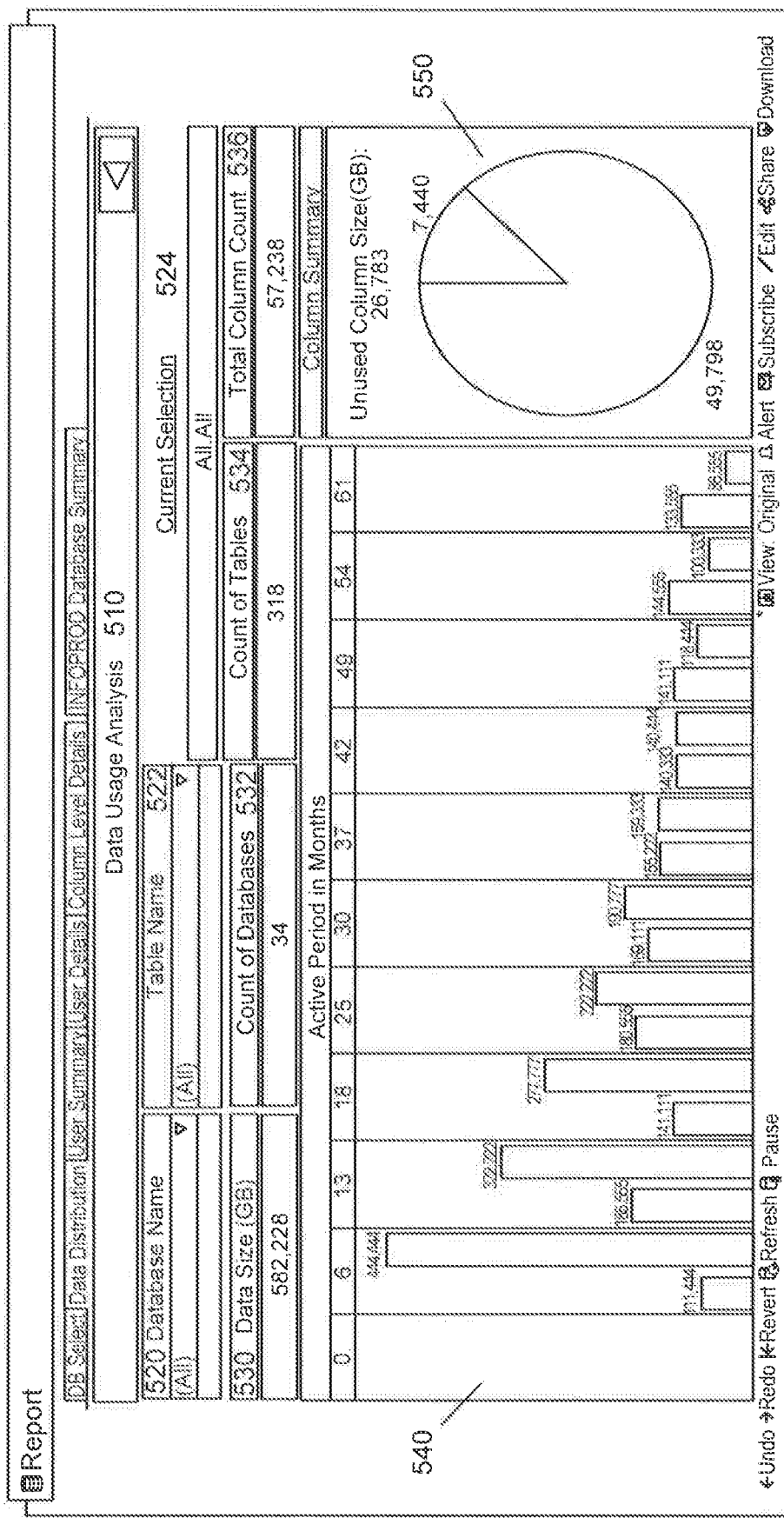
FIG. 5 is an exemplary interactive user interface, according to an embodiment of the present invention.

FIG. 5 is an exemplary interactive user interface, according to an embodiment of the present invention. FIG. 5 illustrates Data Usage Analysis 510 for a specific database (or group of databases). FIG. 5 may include specifics including Database Name 520, Table Name 522, and Current Selection 524. Metrics may include Data Size 530, Count of Databases 532, Count of Tables 534 and Total Column Count 536, ale. FIG. 5 may also include graphical data such as Active Period in Months 540 and Column Summary 550. Other variations may be applied. For example, Active Period may include other predetermined time period.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements a data usage analytics engine for database systems, the system comprising:
   a storage component configured to store data usage analytics data;
   an interactive user interface configured to receive user input via a communication network; and
   a computer processor, coupled to the storage component and the communication network, configured to perform:
   receiving one or more database queries;
   accessing a plurality of data sources comprising one or more databases, data object statistics, and data access patterns;
   identifying one or more database tables associated with the one or more database queries from the plurality of data sources;
   parsing, via the data usage analytics engine, the one or more database tables based on the one or more database queries to identify usage metrics, the parsing including horizontal data analysis and column usage analysis, and the usage metrics including a measure of utilization for each of the one or more database tables based on the horizontal data analysis and a measure of utilization for each of a plurality of attributes from the one or more database tables based on the column usage analysis;
   generating, via the data usage analytics engine, one or more data usage patterns based on the usage metrics wherein the data usage patterns are identified on a periodic basis and identify what tables are used, how much of data is queried at what intervals, frequency of querying, and one or more attributes used in the queries;
   transmitting the data usage patterns to the interactive user interface;
   predicting access to a type of dataset at a particular time period based on the data usage patterns, and determining a first number of data requests and, based on the periodic basis and out of the first number of data requests, a second number of data requests that were not active in a most recent time period;
   determining an optimal storage configuration for remote and local storage based on the data usage patterns, the first number of data requests, and the second number of data requests that were not active in the most recent time period;
   generating a first interactive user interface display screen that provides the data usage patterns for at least one of the one or more databases, the first interactive user interface display screen including the usage metrics for periodic intervals, based on the periodic basis, and summary data of the usage metrics for the most recent time period, the summary data including a table summary and a first column summary, the table summary showing a used table count and an unused table count for the one or more database tables included in the at least one of the one or more databases, the first column summary including a used column count and an unused column count; and generating a second interactive user interface display screen that provides data usage analysis data for the at least one of the one or more databases, the second interactive user interface display screen including active periods for the periodic intervals, based on the periodic basis, and a second column summary, the second column summary including a used column size and an unused column size, wherein, in the first interactive user interface display screen and the second interactive user interface display screen, the usage metrics for the periodic intervals and the active periods for the periodic intervals are each displayed as a first type of graphical element, and the first column summary and the second column summary are each displayed as a second type of graphical element different than the first type of graphical element, wherein the usage metrics for the periodic intervals and the active periods for the periodic intervals are each displayed as a graphical element on a first side of the first interactive user interface display screen and the second interactive user interface display screen, respectively, wherein the first column summary and the second column summary are each displayed as a graphical element on a second side opposite the first side of the first interactive user interface display screen and the second interactive user interface display screen, respectively, wherein the optimal storage configuration includes moving data of the type of dataset for which access is predicted from a storage service to the local storage based on when the data is predicted to be accessed, wherein the optimal storage configuration further includes compressing second data stored in the local storage when the second data cannot be moved to the remote storage, and wherein the data of the type of dataset for which access is predicted is identified for a user of a specific role.

2. The system of claim 1, wherein the one or more database queries comprise SQL queries.

3. The system of claim 1, wherein the one or more database tables comprise Internal Catalog tables.

4. The system of claim 1, wherein the data usage patterns comprise Hot, Warm and Cold categories indicating frequency of data usage.

5. The system of claim 1, wherein the optimal storage configuration comprises recommendations for local storage, remote storage, cloud services and archival services.

6. The system of claim 1, wherein the optimal storage configuration comprises compression recommendations.

7. The system of claim 1, wherein the data usage patterns comprise frequently used data, less frequently used data and unused data.

8. The system of claim 1, wherein the data usage patterns comprise Count of Schemas\Tables; Count of Total\Unused Partitions; Data Size; Unused Partition Data Size; and Total Column Count.

9. The system of claim 1, wherein the data usage patterns comprise Data Size, Count of Databases, Count of Tables and Total Column Count.

10. A method that implements a data usage analytics engine for database systems, the method comprising:

receiving one or more database queries;

accessing a plurality of data sources comprising one or more databases, data object statistics, and data access patterns;

identifying one or more database tables associated with the one or more database queries from the plurality of data sources;

parsing, via the data usage analytics engine, the one or more database tables based on the one or more database queries to identify usage metrics, the parsing including horizontal data analysis and column usage analysis, and the usage metrics including a measure of utilization for each of the one or more database tables based on the horizontal data analysis and a measure of utilization for each of a plurality of attributes from the one or more database tables based on the column usage analysis;

generating, via the data usage analytics engine, one or more data usage patterns based on the usage metrics wherein the data usage patterns are identified on a periodic basis and identify what tables are used, how much of data is queried at what intervals, frequency of querying, and one or more attributes used in the queries;

transmitting the data usage patterns to an interactive user interface;

predicting access to a type of dataset at a particular time period based on the data usage patterns, and determining a first number of data requests and, based on the periodic basis and out of the first number of data requests, a second number of data requests that were not active in a most recent time period;

determining an optimal storage configuration for remote and local storage based on the data usage patterns, the first number of data requests, and the second number of data requests that were not active in the most recent time period;

generating a first interactive user interface display screen that provides the data usage patterns for at least one of the one or more databases, the first interactive user interface display screen including the usage metrics for periodic intervals, based on the periodic basis, and summary data of the usage metrics for the most recent time period, the summary data including a table summary and a first column summary, the table summary showing a used table count and an unused table count for the one or more database tables included in the at least one of the one or more databases, the first column summary including a used column count and an unused column count;

generating a second interactive user interface display screen that provides data usage analysis data for the at least one of the one or more databases, the second interactive user interface display screen including active periods for the periodic intervals, based on the periodic basis, and a second column summary, the second column summary including a used column size and an unused column size, wherein, in the first interactive user interface display screen and the second interactive user interface display screen, the usage metrics for the periodic intervals and the active periods for the periodic intervals are each displayed as a first type of graphical element, and the first column summary and the second column summary are each displayed as a second type of graphical element different than the first type of graphical element, wherein the usage metrics for the periodic intervals and the active periods for the periodic intervals are each displayed, as the first type of graphical element, on a first side of the first interactive user interface display screen and the second interactive user interface display screen, respectively, wherein the first column summary and the second column summary are each displayed, as the second type of graphical element, on a second side opposite the first side of the first interactive user interface display screen and the second interactive user interface display screen, respectively, wherein the optimal storage configuration includes moving data of the type of dataset for which access is predicted from a storage service to the local storage based on when the data is predicted to be accessed, wherein the optimal storage configuration further includes compressing second data stored in the local storage when the second data cannot be moved to the remote storage, and wherein the data of the type of dataset for which access is predicted is identified for a user of a specific role.

11. The method of claim 10, wherein the one or more database queries comprise SQL queries.

12. The method of claim 10, wherein the one or more database tables comprise Internal Catalog tables.

13. The method of claim 10, wherein the data usage patterns comprise Hot, Warm and Cold categories indicating frequency of data usage.

14. The method of claim 10, wherein the optimal storage configuration comprises recommendations for local storage, remote storage, cloud services and archival services.

15. The method of claim 10, wherein the optimal storage configuration comprises compression recommendations.

16. The method of claim 10, wherein the data usage patterns comprise frequently used data, less frequently used data and unused data.

17. The method of claim 10, wherein the data usage patterns comprise Count of Schemas\Tables; Count of Total\Unused Partitions; Data Size; Unused Partition Data Size; and Total Column Count.

18. The method of claim 10, wherein the data usage patterns comprise Data Size, Count of Databases, Count of Tables and Total Column Count.

* * * * *